June 23, 1942.  K. M. NEWCUM  2,287,633
PIPING SYSTEM AND MANIFOLD CONSTRUCTION
Filed Aug. 16, 1939  2 Sheets-Sheet 1
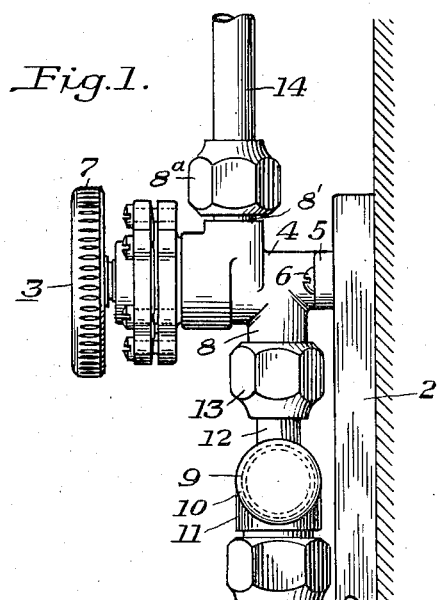
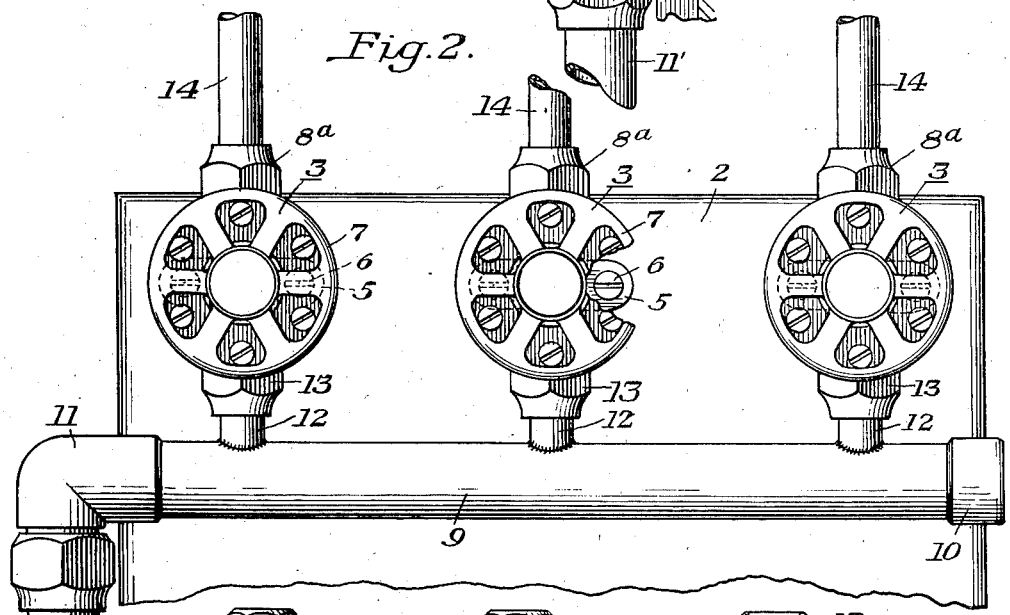
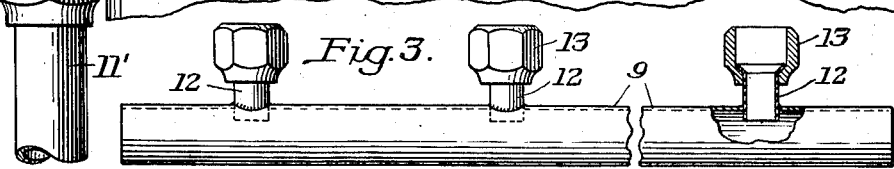
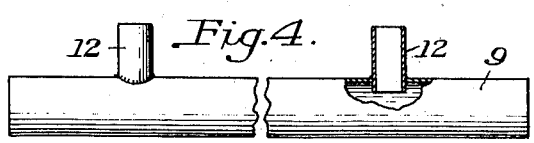
INVENTOR
Kenneth M Newcum
by his attys.
Stebbins, Blenko & Parmelee June 23, 1942.     K. M. NEWCUM     2,287,633
PIPING SYSTEM AND MANIFOLD CONSTRUCTION
Filed Aug. 16, 1939     2 Sheets-Sheet 2
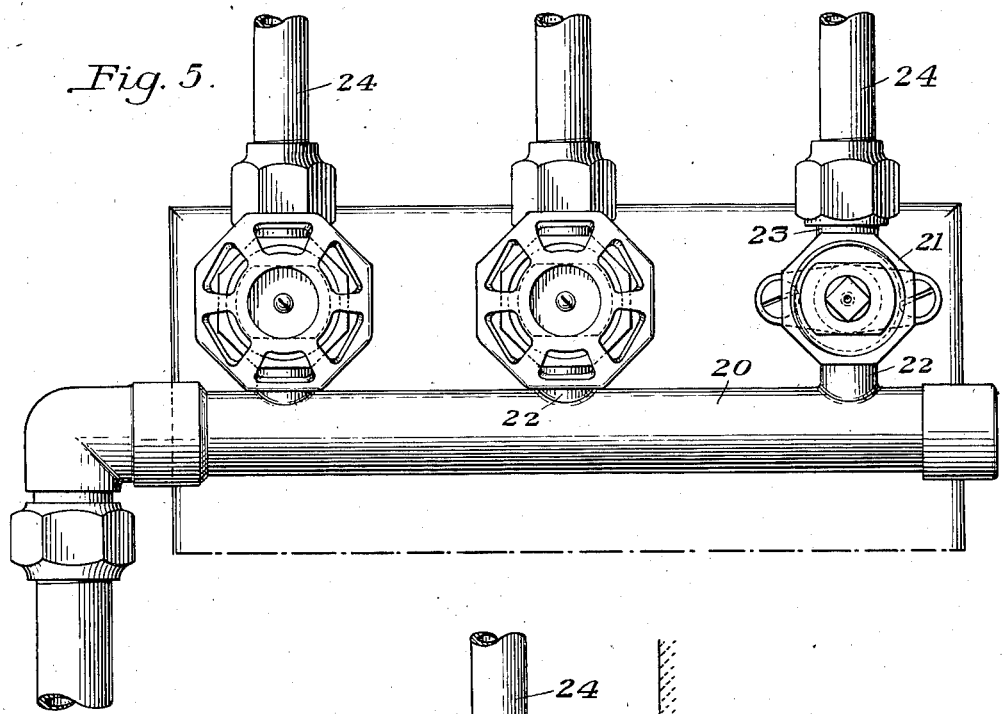
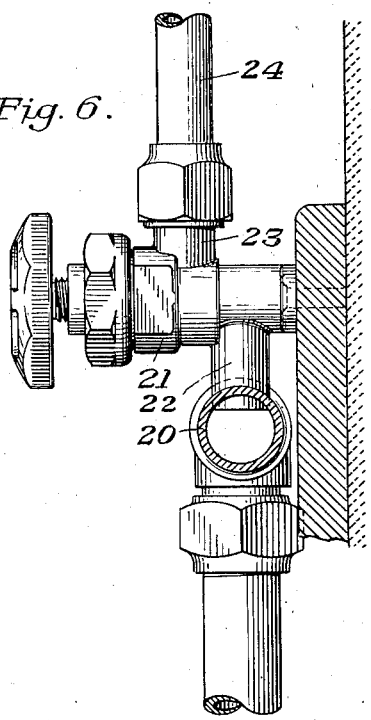
INVENTOR
Kenneth M. Newcum
by his attys.
Stebbins, Blenko & Parmelee Patented June 23, 1942

2,287,633

UNITED STATES PATENT OFFICE 2,287,633

PIPING SYSTEM AND MANIFOLD CONSTRUCTION

Kenneth M. Newcum, Pittsburgh, Pa., assignor to Superior Valve & Fittings Company, Pittsburgh, Pa., a corporation of Pennsylvania Application August 16, 1939, Serial No. 290,413

4 Claims. (Cl. 137—78)

This invention relates to piping systems and more particularly to a piping system utilizing a manifold and to a manifold construction.

The present invention has particular application to the refrigerating art. In refrigerating systems used in stores and similar places where two or three or possibly more cooling units are operated from a single refrigerating plant, it is necessary to use manifolds by means of which refrigerant may be carried from the compressing and condensing mechanism to each of the several cooling devices and be returned from each of the several cooling devices to the compressing and condensing unit. To avoid obstructing useful space and reduce likelihood of damage to the system, it is desirable in most such installations to keep the piping as close as possible to the walls of the building, and it is desirable to eliminate as far as possible, any unnecessary bending of the pipe. It is also desirable to have the piping as compact as possible and of a type that may be easily and cheaply installed.

Heretofore in refrigerating systems using manifolds, the manifolds have been specially constructed parts having means by which they can be attached and secured to a wall or panel. These manifolds as heretofore constructed have also had connections so that control valves for the individual pipe lines branching out of the manifold can be mounted directly on the manifold. Such arrangements are relatively expensive in that the manifold has to be more or less specially designed for a particular installation. They require considerable bending of the pipes because when the valves are carried by the manifold, they project some distance from the wall along which the pipes are run.

According to the present invention there is provided a piping system and manifold arrangement whereby the manifold is of a very cheap and inexpensive construction and wherein the whole assembly may be kept close to the surface of the wall or panel alongside which the piping is installed and wherein space is conserved by having the valves support the manifold rather than having the manifold support the valves.

The invention may be more readily understood by reference to the accompanying drawings in which:

Figure 1 is an end view of a piping installation embodying my invention;

Figure 2 is a front elevation of the assembly shown in Figure 1;

Figure 3 is a detailed view of the manifold itself;

Figure 4 is a view similar to Figure 3 of a slightly modified form of manifold;

Figure 5 is a view similar to Figure 2 illustrating a modified construction; and Figure 6 is a view similar to Figure 1 of the same modification.

In the drawings 2 designates a panel adapted to support the manifold and valves. The panel 2 is preferably mounted adjacent a wall as illustrated in Figure 1. Mounted on the panel is a row of valves, each valve being of similar construction. These valves are designated generally as 3. Each comprises a body member 4 having its main or longitudinal axis perpendicular to the panel 2. At the base of each of the body members 4 is a foot portion 5 providing oppositely extending pads or ears through which screws or bolts 6 for securing the valves to the panel pass. By this arrangement the valves are mounted directly on and are secured to the panel. At the opposite end of each valve body is an operating device such as a hand wheel 7 through which the valve may be operated. Each valve body is provided with a nipple 8 projecting therefrom perpendicularly to the longitudinal axis of the body 4. The several nipples 8 are parallel. Extending below the valves is a manifold 9. The manifold comprises a piece of ordinary tubing which may be closed at one end by a cap as indicated at 10 and which may have a fitting 11 at its other end by means of which the tube can be connected into a pipe line. Soldered into the pipe 9 at regular intervals are tubular studs 12. These studs have a threaded connection of a type commonly used in the art with a connecting nut 13, the nuts 13 being screwed to the nipples 8 thereby providing the connection between the several valves and the manifold.

This system of piping therefore provides an arrangement by means of which the manifold is supported by the valves while the valves themselves are rigidly secured to a supporting panel. The valves also have nipples 8' extending in a direction opposite to the nipples 8 having connecting nuts 8a for connection to the several branch pipes 14 leading to or from the various cooling units. It will be noted that this arrangement enables the pipes 14 to be close to the wall of the building and that no sharp bends are required to join them to the valves. Likewise, the manifold lies close to the plane of the wall of the building and the pipe 11' leading from the manifold is close to the face of the wall.

The manifold tube 9, being an ordinary piece of tubing instead of a special casting, can be very cheaply and economically manufactured. This tubing with the studs 12 soldered therein may be made up in stock lengths of several feet and then pieces can be cut off from this long length to meet the requirements of any given installation whether it has two branch pipes or three branch pipes or more. After the tube has been cut to length, the cap 10 can be soldered onto one end and the fitting 11 can be soldered onto the other end completing the manifold. In assembling the system the valves 3 can be attached to the manifold and then laid against the panel and the panel drilled or marked for the screws or bolts 6. In this way the valves automatically space themselves to the distances between the manifold studs 12 so that even if the studs are not uniformly spaced, no complication is involved.

In the modification shown in Figure 4, the manifold is of the general construction shown in Figure 3, but the studs 12 instead of being provided with nuts 13 are straight. This type of manifold is used in connection with valves where the connection between the studs and the valve nipples is made through the use of the soldered sleeve coupling rather than through the use of a nut. Both soldered and threaded joints are commonly used in refrigeration pipes, and the manifold of Figure 3 is for use where the valves are provided with threaded nipples and the manifold of Figure 4 is provided for use where the valves have nipples designed for soldered joints.

The present preferred embodiment of the invention is illustrated in Figures 5 and 6. According to this modification, the provision of the studs 12 from the manifold pipe is eliminated and nipples on the valves themselves are soldered directly into the manifold. Referring to these figures of the drawings, the manifold is designated generally as 20. The several valves are designated generally as 21. They are provided with integral nipples 22. These nipples are fitted into aligned holes in the manifold tube 20 and they are soldered so that the valve bodies are permanently attached to the manifold tube. The several valves also have oppositely extending nipples 23 to which pipes 24, corresponding to the pipes 14, are connected.

This arrangement has several advantages over the construction described in connection with Figures 1 to 4. In the first place, the assembly is more compact because the manifold tube is located much closer to the valve bodies. The construction is considerably stronger because the nipples 22 formed integrally with the valve body are heavier and stronger than the studs 12 of the form first described. It has been found that the elimination of the studs 12 which are necessarily made of more or less ductile tubing has very considerably decreased the damage in transit of these assemblies. This modification also decreases damage occurring to the assembly in the installation of the manifolds or in the subsequent use of them. While it is entirely practical to use the studs 12, care has to be taken in the installation of the manifolds that the valves are not twisted or subjected to strain sufficient to bend the studs, and the valves have to be protected from any blow or strain that might subsequently damage the studs 12. With the modification shown in Figures 5 and 6, both the manifold 20 and the valve nipple 22 are of heavy construction and the assembly is not likely to be damaged either in installation or in subsequent use.

The modification shown in these figures also reduces the cost of the assembly because it is unnecessary to form any threads on the valve nipples 22 and it is unnecessary to use the couplings 13. The elimination of the couplings between the manifolds and the valves not only cheapens the cost, but makes the structure more fluid-tight.

Experience has demonstrated that a piping system embodying the present invention can be very much more cheaply and easily installed than piping systems of this character heretofore used, and a saving of space is secured and the piping system can be kept much closer to the wall than heretofore. This is desirable not only from the standpoint of avoiding the bending of the pipe, but as a matter of protection to the system itself as these systems are frequently located in basements where articles are stored and where, if they project too far from the wall, are likely to be damaged.

I claim:

1. A manifold structure comprising in combination a supporting panel having a row of valves mounted thereon, each valve having a body whose main axis is perpendicular to the panel, each body having a foot at the base thereof by means of which it is attached to and supported on the panel, each body also having a connecting nipple projecting therefrom perpendicular to its longitudinal axis, the nipples of the several valve bodies being parallel and in the same plane, and a manifold tube with which the several nipples are connected, said manifold tube being thereby located to one side of the row of valves in the same plane as the nipples which connect to it and being supported in position by the valves.

2. A multi-valved manifold comprising a plurality of valves having bodies, a panel to which the several valve bodies are secured in side-by-side relation, a manifold tube extending along the row of valves in a direction transverse to the longitudinal axes thereof and in a position intermediate the opposite ends of the valve bodies, and rigid connecting means between the manifold tube and several valve bodies by means of which the manifold tube is attached to and supported by the several valve bodies in close proximity thereto and the face of the panel.

3. A manifold structure comprising a manifold tube having a plurality of aligned connecting studs leading therefrom at points along its length, a valve connected to each stud, each valve having a body portion with a supporting foot at the base thereof, each valve body having an extension perpendicular to its longitudinal axis which is connected to the stud of the manifold and having another extension just opposite the first one and is adapted to be connected to a branch pipe, and a supporting panel on which the feet of the several valves rest and to which they are secured, the arrangement being such that the manifold is supported by the valves closely adjacent the face of the supporting panel.

4. A piping system comprising a supporting panel having a row of valves mounted thereon, each valve having a body whose main axis is perpendicular to the panel, each valve body having a foot at the base thereof by means of which it is attached to and supported on the panel, each body also having a connecting nipple projecting therefrom perpendicular to its longitudinal axis, the nipples of the several valve bodies being parallel and in the same plane, a manifold tube having a plurality of studs connected to the nipples, said manifold tube being thereby located to one side of the row of valves and being supported in position by the valves, each valve body also having a second nipple projecting therefrom in a direction opposite the first, and a pipe connected to each of said second nipples whereby both the pipes and the manifold may be kept in a plane close to the plane of the front of the panel.

KENNETH M. NEWCUM.